(12) United States Patent
Liu et al.

(10) Patent No.: US 7,320,270 B2
(45) Date of Patent: Jan. 22, 2008

(54) TABLE SAW

(75) Inventors: Chia-Sheng Liu, Chiayi County (TW); Yu-Feng Chan, Kaohsiung County (TW)

(73) Assignee: Durq Machinery Corp. (TW)

( * ) Notice: Subject to any disclaimer, the term of this patent is extended or adjusted under 35 U.S.C. 154(b) by 63 days.

(21) Appl. No.: 11/136,546

(22) Filed: May 25, 2005

(65) Prior Publication Data

US 2006/0236835 A1    Oct. 26, 2006

(30) Foreign Application Priority Data

Apr. 26, 2005  (TW) ............................... 94206545 U

(51) Int. Cl.
*B27B 27/06*  (2006.01)
*B23D 45/04*  (2006.01)

(52) U.S. Cl. ..................... 83/471.3; 83/473; 83/477.1; 83/477.2; 83/581; 83/477; 83/698.51

(58) Field of Classification Search ............... 83/477.2, 83/473, 477.1, 582, 665, 581, 698.31, 698.51, 83/698.61, 471.3, 471.1, 471.2, 472, 477, 83/491

See application file for complete search history.

(56) References Cited

U.S. PATENT DOCUMENTS

| 2,106,288 | A  | * | 1/1938  | Tautz ........................... 83/438 |
| 6,684,750 | B2 | * | 2/2004  | Yu ................................ 83/473 |
| 6,820,524 | B1 | * | 11/2004 | Ceroll et al. ................... 83/13 |
| 2002/0005103 | A1 | * | 1/2002 | Ceroll et al. .................. 83/473 |
| 2003/0150312 | A1 | * | 8/2003 | Chang ........................ 83/473 |
| 2004/0118261 | A1 | * | 6/2004 | Garcia et al. .............. 83/471.3 |
| 2005/0188806 | A1 | * | 9/2005 | Garcia et al. .............. 83/471.3 |
| 2005/0199113 | A1 | * | 9/2005 | Ku et al. ...................... 83/473 |
| 2006/0219075 | A1 | * | 10/2006 | Liu et al. .................... 83/471.3 |

* cited by examiner

*Primary Examiner*—Ghassem Alie
(74) *Attorney, Agent, or Firm*—Bacon & Thomas, PLLC

(57) ABSTRACT

A table saw includes a table, a saw unit coupled to a substantially inverted U-shaped suspension girder, two supporting devices fixedly fastened to the bottom side of the table to support the suspension girder, and two sliding blocks respectively fastened to the two ends of the suspension girder and respectively coupled to a respective arched guide slot in each of the supporting devices to guide movement of the suspension girder along an arched track to keep the cutting reference point of the saw blade in position so that the saw blade can cut the workpiece accurately.

5 Claims, 10 Drawing Sheets

TABLE SAW

BACKGROUND OF THE INVENTION

1. Field of the Invention

The present invention relates to tabletop sawing apparatus and more particularly, to a table saw, which enables the saw blade to be lifted, lowered and tilted.

2. Description of the Related Art

FIG. 1 shows the relative position between the table 1 and the saw unit 2 in a table saw according to the prior art. The table 1 has an opening 1a, and a suspension rod 3 arranged at the bottom side in parallel to the longitudinal axis of the opening 1a.

The saw unit 2 comprises a linking mechanism 2a, a motor drive 2b, and a saw blade 2c. The linking mechanism 2a is coupled to the suspension rod 3. The motor drive 2b is affixed to the linking mechanism 2a. The saw blade 2c is fastened to the output shaft of the motor drive 2b and deviated from the suspension rod 3. The saw table comprises an adjustment unit (not shown) adapted to drive the linking mechanism 2a and to further move the saw blade 2c vertically or to tilt the saw blade 2c. For example, the top side of the saw blade 2c passes through the opening 1a and is kept perpendicular to the top surface 1b of the table 1. At this time, the cutting reference point of the saw blade 2c is at the location referenced by A. By means of the indication of the scale system (not shown) at the table 1, the operator can cut the workpiece accurately subject to the desired size.

However, there is a distance S between the saw blade 2c and the suspension rod 3. When turning the saw blade 2 about the suspension rod 3 to change the tilting angle of the saw blade 2c as shown in FIG. 2, the cutting reference point of the saw blade 2c is shifted from location A to location B. Under the same scale system, the change of the position of the cutting reference point of the saw blade 2c results in a cutting error.

Further, as shown in FIG. 3, the suspension rod 3 must have toughness sufficient to support the saw unit 2. Normally, the suspension rod 3 used has a diameter about 9.5 mm. When lifting the saw blade 2c to the extent that the motor drive 2b touches the suspension rod 3, the saw blade 2c reaches the upper limit position. At this time, the distance S1 between the topmost edge of the saw blade 2c and the top surface of the table 1 is equal to the maximum cutting depth of the saw blade 2c for the workpiece. However, the diameter of 9.5 mm of the suspension rod 3 shortens the lifting space for the saw blade 2c.

Therefore, it is desirable to provide a table saw that eliminates the aforesaid drawbacks.

SUMMARY OF THE INVENTION

The present invention has been accomplished under the circumstances in view. It is one object of the present invention to provide a table saw, which enables the saw blade to have the same cutting reference point when set perpendicular to the table or in any of a variety of tilted positions.

It is another object of the present invention to provide a table saw, which enables the saw blade to have a greater cutting depth for cutting different workpieces.

To achieve these objects of the present invention, the table saw comprises a machine base having a side panel and an arched slot formed in the side panel; a table provided at a top side of the machine base and provided with a front side, a rear side, and an opening cut through top and bottom walls thereof; two supporting devices respectively fixedly fastened to the bottom wall of the table near the front side and the rear side of the table, the supporting devices each having a smoothly arched guide slot; a suspension girder coupled between the supporting devices, the suspension girder comprising two sliding blocks respectively disposed at two ends thereof and respectively coupled to the smoothly arched guide slots of the supporting devices; a lifter pivoted to the suspension girder and movable to and fro relative to the suspension girder; a saw unit fixedly fastened to the lifter, the saw unit comprising a saw blade insertable through the opening of the table; and an adjustment unit having a hand wheel disposed outside the side panel of the machine base, and an adjustment rod inserted through the arched slot of the machine base and coupled between the hand wheel and the lifter for moving the lifter relative to the suspension girder upon rotation of the hand wheel.

DETAILED DESCRIPTION OF THE INVENTION

Figure 1:
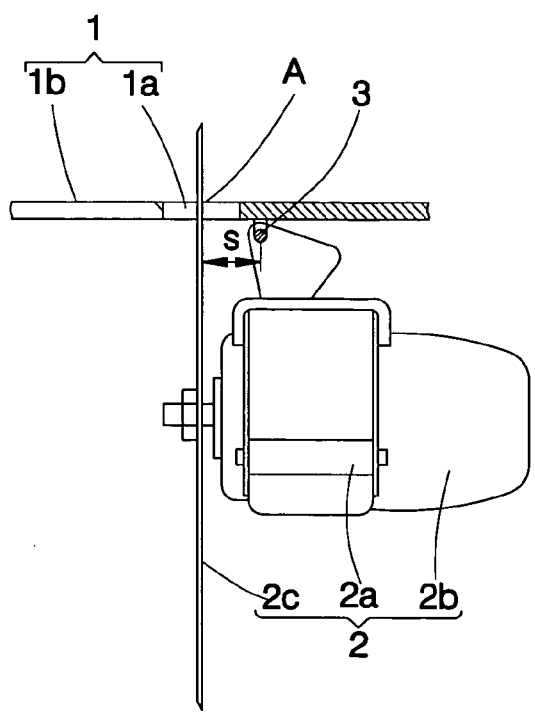
FIG. 1 is a schematic drawing of a part of a conventional table saw, showing the saw blade set in vertical relative to the table.
Figure 2:
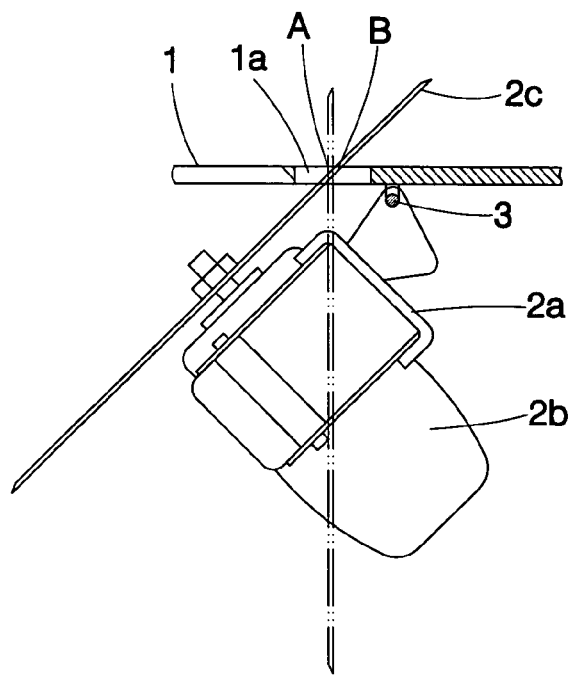
FIG. 2 corresponds to FIG. 1, showing the saw blade tilted.

Referring to FIGS. 4-7, a table saw 100 in accordance with the present invention is shown comprising a machine base 10, a table 14, two supporting devices 18, four screws 22, a suspension girder 24, a lifter 26, a pin 27, a saw unit 28, and an adjustment unit 30.

The machine base 10 has a side panel 10a, an arched slot 11 formed in the side panel 10a, an arched rack 12 extending along one side of the arched slot 11, and angle-indication graduations 13 arranged in parallel to the arched rack 12.

The table 14 is provided at the top side of the machine base 10, having a front side 141, a rear side 142, an opening 143 cut through the top and bottom walls thereof, and two mounting devices 15 and 16. The mounting devices 15 and 16 are respectively formed in the bottom wall near the front side 141 and the rear side 142. According to this embodiment, each mounting device 15 or 16 is comprised of two screw holes 151 or 161.

The two supporting devices 18 each are comprised of a locating plate 19 and a guide plate 20. The locating plate 19 comprises a horizontal wall 191 and a vertical wall 192. The horizontal wall 191 has mounting means formed of two through holes 191a. The vertical wall 192 has a smoothly arched slot 192a. The guide plate 20 is molded from plastics, having a smoothly arched guide slot 201. The guide plate 20 is attached to the respective locating plate 19, keeping the smoothly arched guide slot 201 in communication with the smoothly arched slot 192a of the respective locating plate 19.

The four screws 22 are respectively inserted through the through holes 191a of the horizontal wall 191 of the locating frame 19 of each of the two supporting devices 18 and threaded into the screw holes 151 and 161 of the table 14 to affix the two locating frames 19 to the bottom wall of the table 14.

The suspension girder 24 comprises a horizontally extending flat girder base 241, two vertical side plates 242 and 243 respectively downwardly extending from the two distal ends of the horizontally extending flat girder base 241, two sliding blocks 244, two wings 245, and an inner plate 246. The sliding blocks 244 are respectively inserted through the smoothly arched slot 192a of the vertical wall 192 of the locating plate 19 of each of the supporting devices 18 and the smoothly arched guide slot 201 of the guide plate 20 of each of the supporting devices 18, having a stop face 244a stopped at one side of the respective smoothly arched slot 192a and two through holes 244b formed in the stop face 244a near two distal ends. Screws 247 are respectively inserted through the through holes 244b of the sliding blocks 244 and threaded into the two vertical side plates 242 and 243 of the suspension girder 24 to secure the suspension girder 24 to the supporting devices 18. One vertical side plate 242 of the suspension girder 24 has a locating hole 242a. The two wings 245 are fixedly fastened to and vertically downwardly extending from the bottom side of the horizontally extending flat girder base 241, each having connecting means, for example, a circular hole 245a. The inner plate 246 is arranged in parallel to the vertical side plate 242, having a locating hole 246a.

Figure 8:
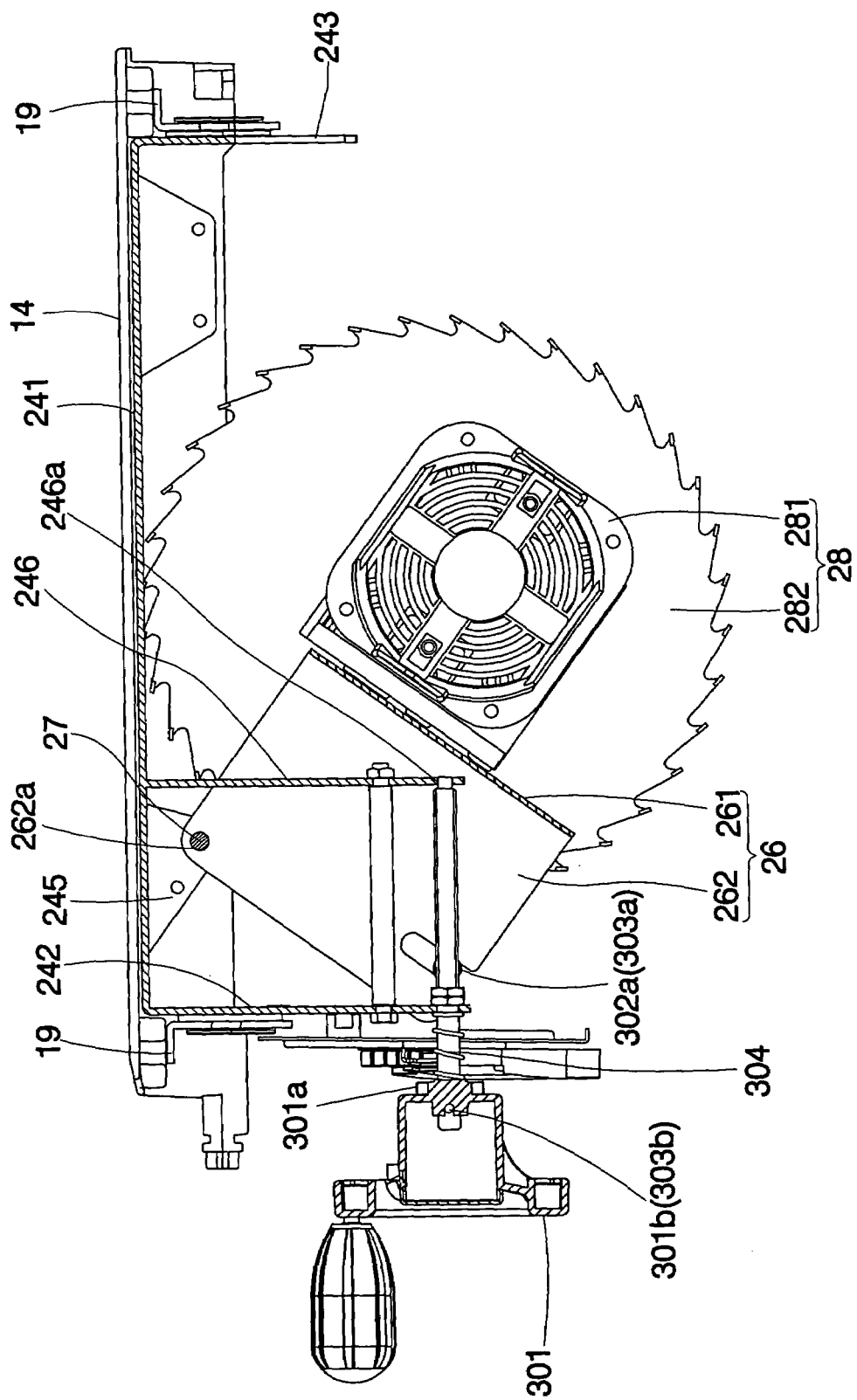
FIG. 8 is a sectional view of the present invention, showing the saw blade received below the table of the table saw.

Referring to FIG. 8 and FIG. 4 again, the lifter 26 comprises a base frame 261, which supports the saw unit 28, and two side frames 262 arranged in parallel at two ends of the base frame 261. The side frames 262 each have a through hole 262a and an elongated slot 262b.

The pin 27 is inserted through the circular holes 245a of the wings 245 and the through holes 262a of the side frames 262 to pivotally secure the lifter 26 to the suspension girder 24 between the wings 245.

The saw unit 28 comprises a motor drive 281, and a saw blade 282. The motor drive 281 is mounted on the base frame 261 of the lifter 26, and adapted to rotate the saw blade 282.

The adjustment unit 30 comprises a hand wheel 301, a driven rod 302, an adjustment rod 303, a spring 304, and a pointer 305.

The hand wheel 301 is provided outside the side panel 10a of the machine base 10, having a gear 301a and a connecting portion 301b.

The driven rod 302 is inserted with the two distal ends thereof into the elongated slots 262b of the side frames 262 of the lifter 26, having a transversely extending screw hole 302a.

Figure 9:
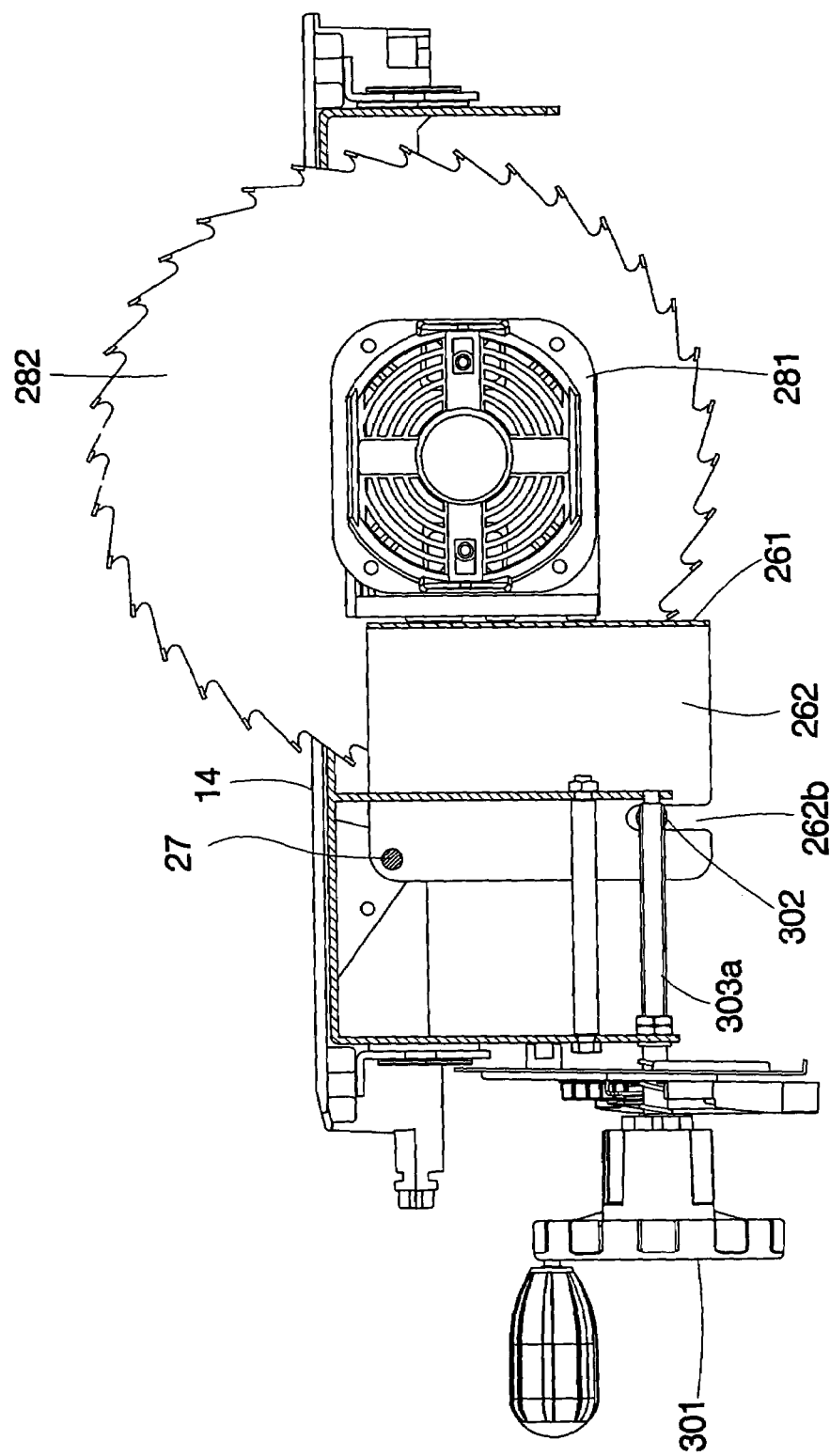
FIG. 9 is a schematic sectional view of the present invention, showing the saw blade protruded over the table of the table saw.
Figure 10:
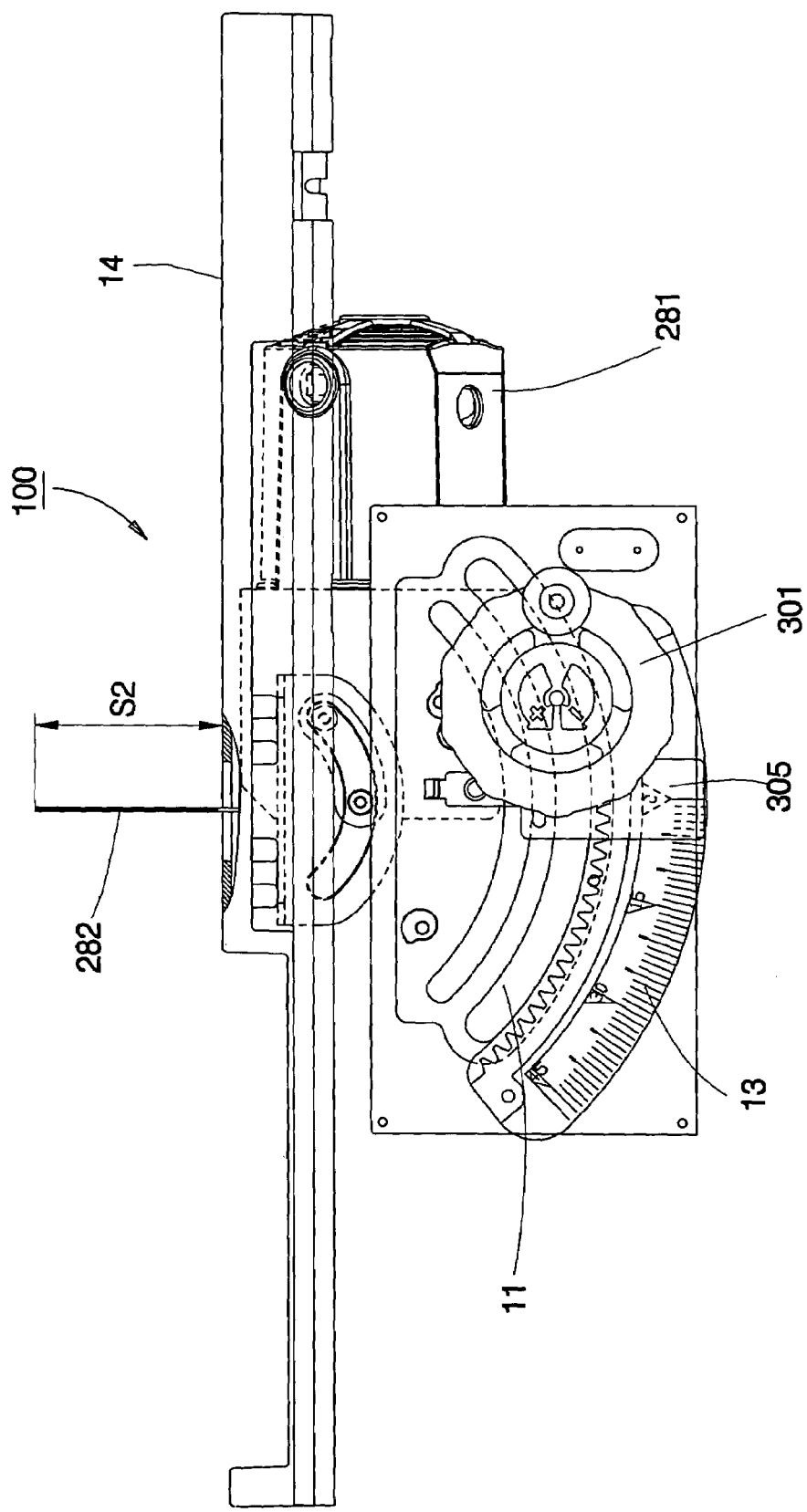
FIG. 10 is a schematic drawing of a part of the table saw, showing the saw blade set perpendicular to the top surface of the table according to the present invention.

The adjustment rod 303 has a threaded shank 303a and a connecting portion 303b at one end of the threaded shank 303a. The spring 304 is set between the hand wheel 301 and one vertical side plate 242 of the suspension girder 24, and adapted to force the connecting portion 303b of the adjustment rod 303 into engagement with the connecting portion 301b of the hand wheel 301 when the hand wheel 301 receives no pressure (see FIG. 8). The threaded shank 303a of the adjustment rod 303 is inserted through the spring 304, the arched slot 11 of the side panel 10a of the machine base 10, the locating hole 242a of the suspension girder 24, and the transversely extending screw hole 302a of the driven rod 302 into the locating hole 246a of the inner plate 246. When driving the hand wheel 301 to rotate the adjustment rod 303, the driven rod 302 is driven by the adjustment rod 303 to change its position so as to lift and lower the saw blade 282. FIG. 8 shows the saw blade 282 received below the table 14. FIGS. 9 and 10 show the saw blade 282 protruding over the table 14.

The pointer 305 is connected to the suspension girder 24 through a connector 306. When pressed the hand wheel 301 to disengage the connecting portion 301b from the connecting portion 303b of the adjustment rod 303, the gear 301a is forced into engagement with the arched rack 12. At this time, the user can rotate the hand wheel 301 to tile the saw blade 282 (see FIG. 11), and the tilting angle of the saw blade 282 is known by means of the indication of the pointer 305 at the angle-indication graduations 13.

Figure 11:
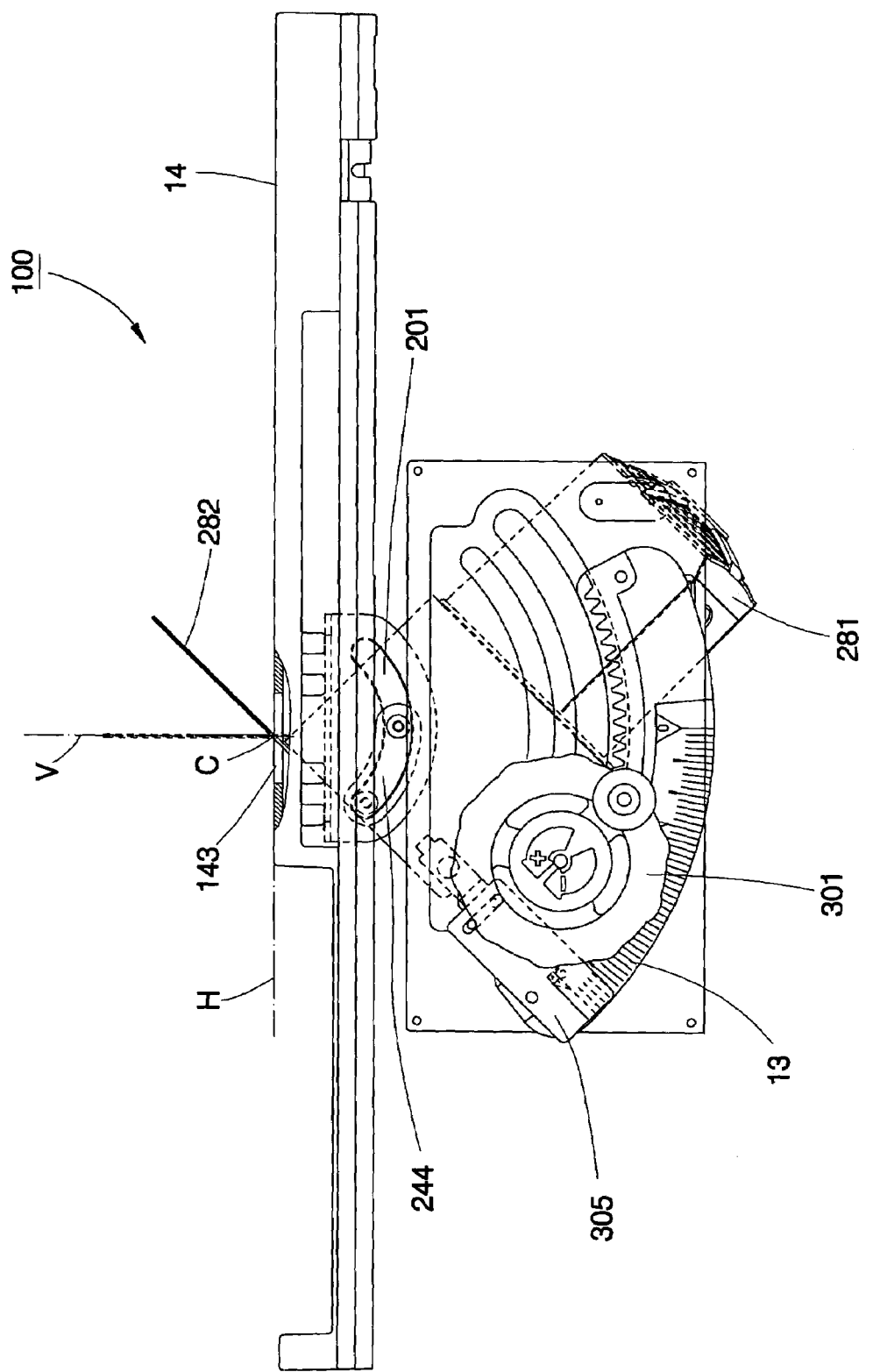
FIG. 11 is a schematic drawing of a part of the table saw, showing the saw blade tilted relative to the table according to the present invention.

Referring to FIG. 11, the table 14 has a horizontal axis H and a vertical axis V. The horizontal axis H extends along the top surface of the table 14. The vertical axis V passes through the opening 143 and intersected with the horizontal axis H. The intersected point between the horizontal axis H and the vertical axis V is referenced to be the center point C. When lifting the saw blade 282, it passes through the center point C, and the two sliding blocks 244 are moved along a circular track of which the center coincides with the center point C. When the saw blade 282 is set perpendicular to the top surface of the table 14, the cutting reference point of the saw blade 282 is at the center point C. When tilting the saw blade 282, the saw blade 282 is turned about the center point C, i.e., the cutting reference point of the saw blade 282 remains unchanged for accurate cutting operation when setting the saw blade 282 is any of a variety of angular positions.

Figure 3:
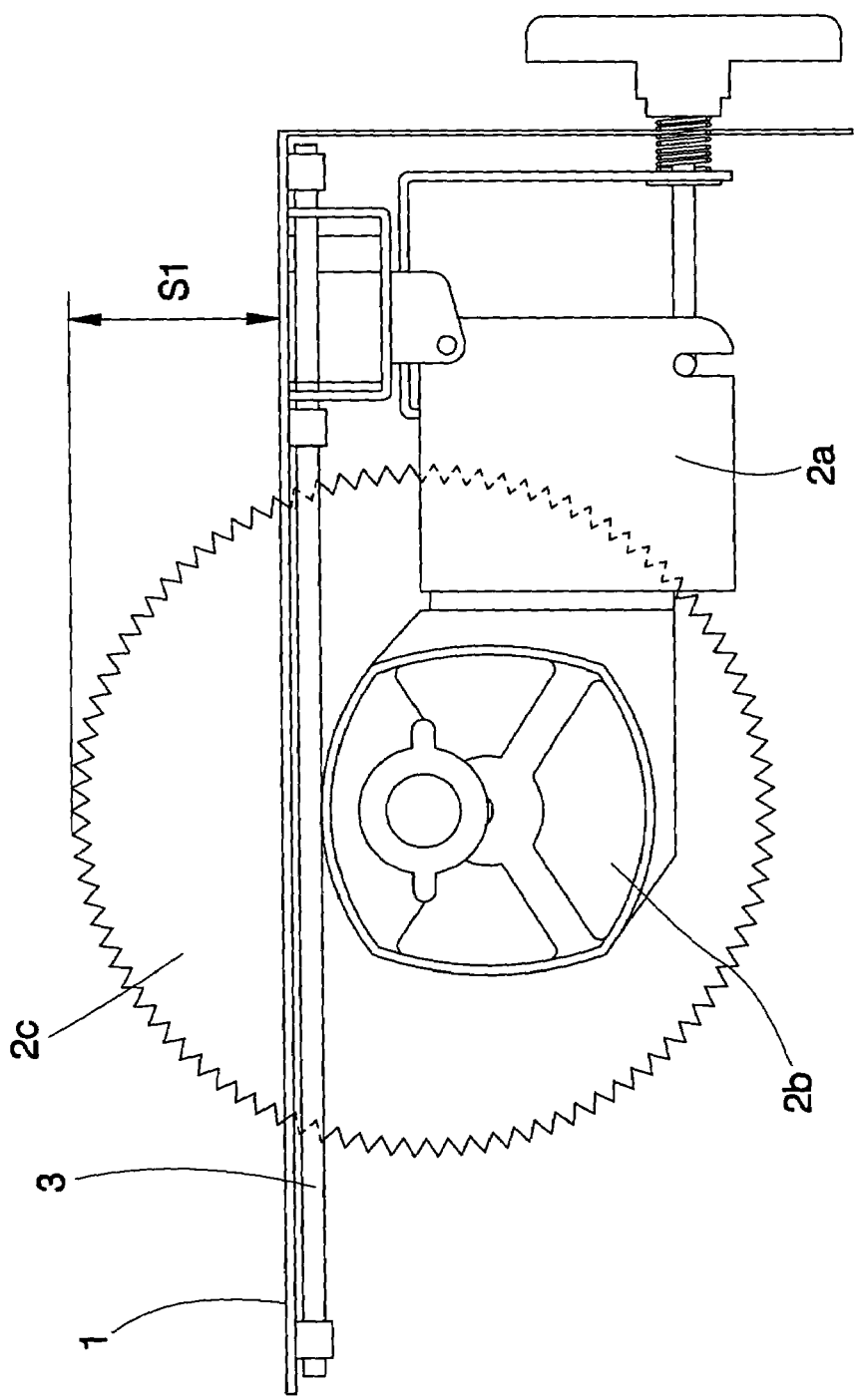
FIG. 3 is a schematic drawing of the prior art table saw, showing the saw blade lifted.
Figure 4:
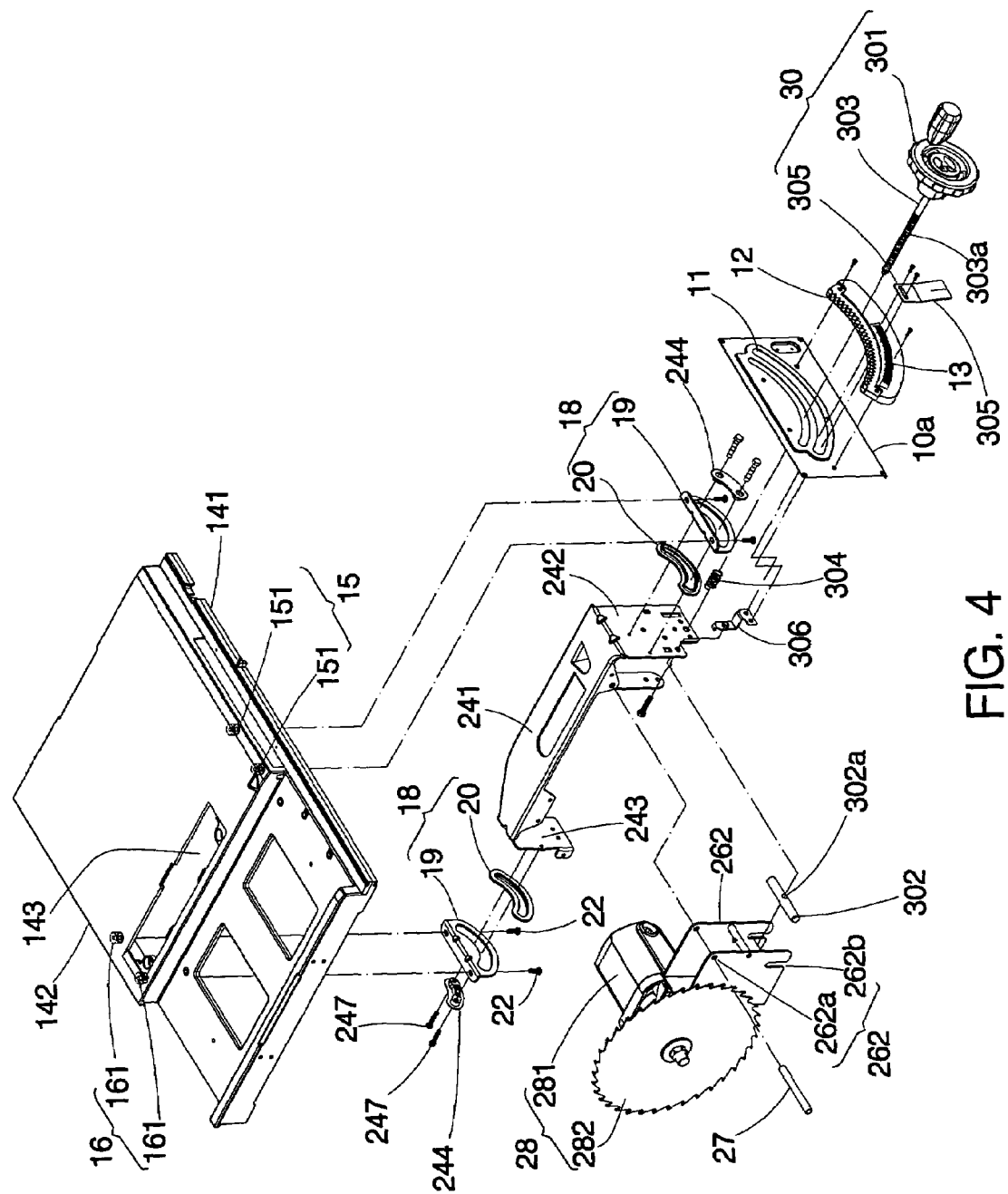
FIG. 4 is an exploded view of a table saw according to the present invention.
Figure 5:
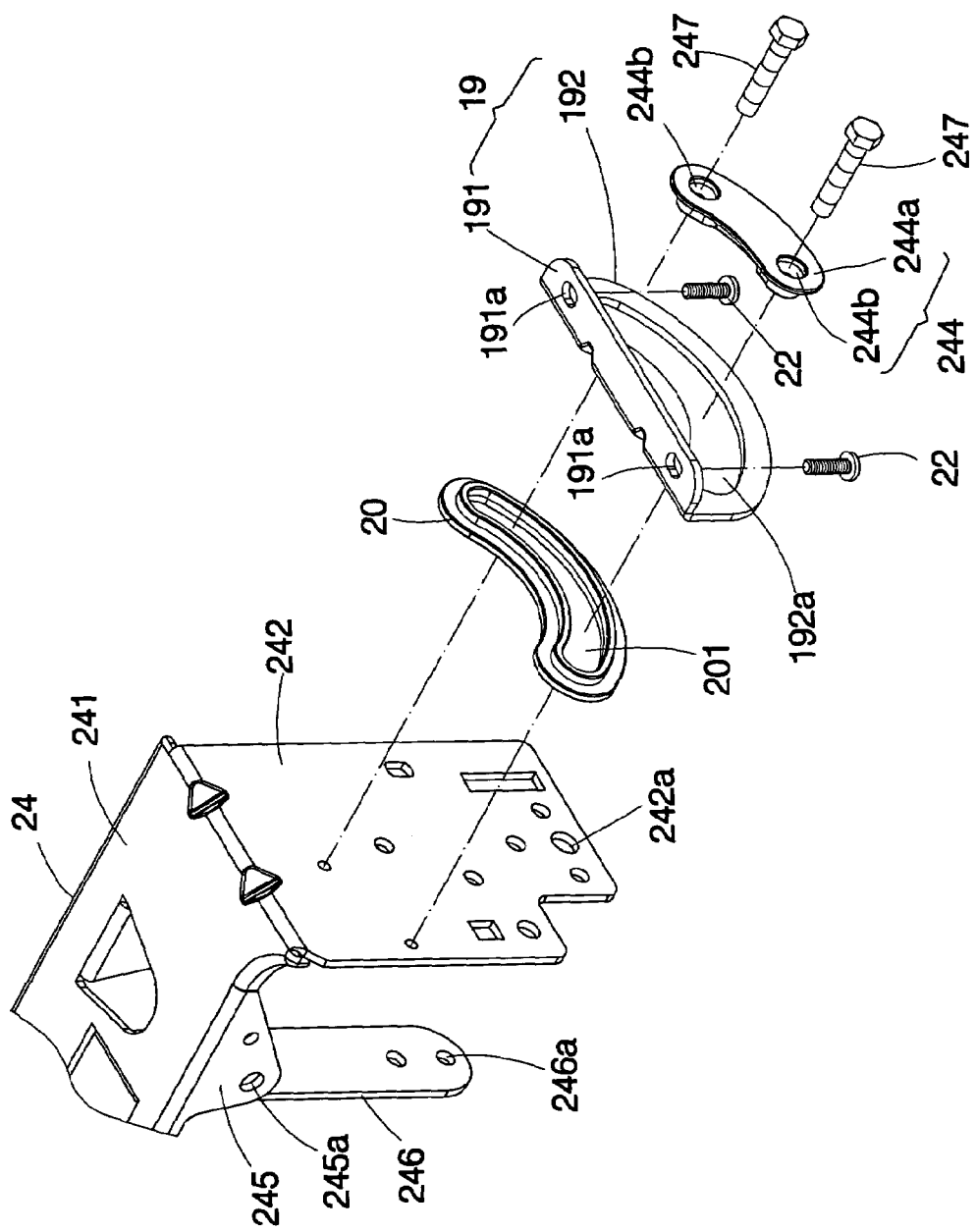
FIG. 5 is an exploded view of a part of FIG. 4.
Figure 6:
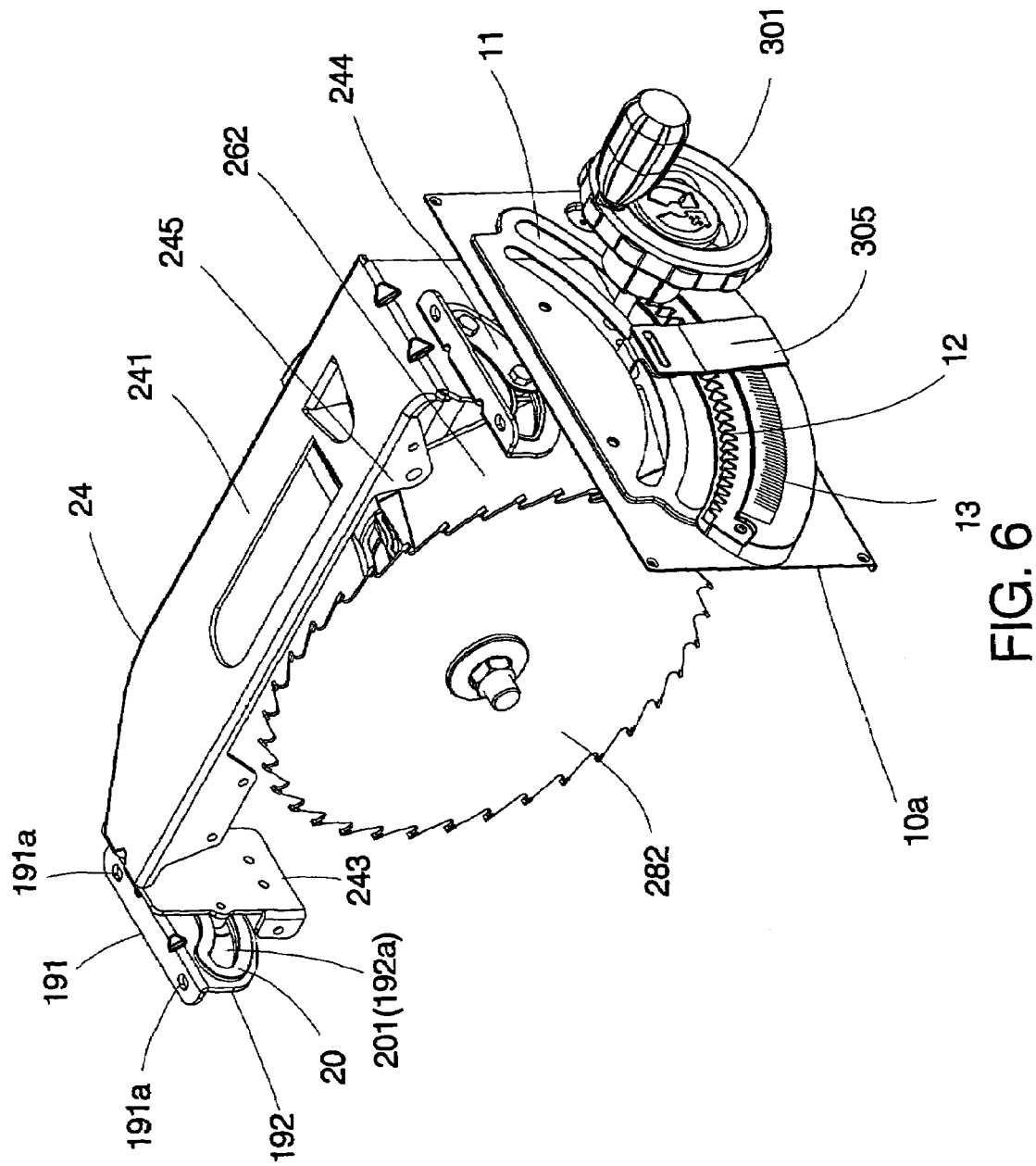
FIG. 6 is a perspective assembly view of a part of the table saw according to the present invention.
Figure 7:
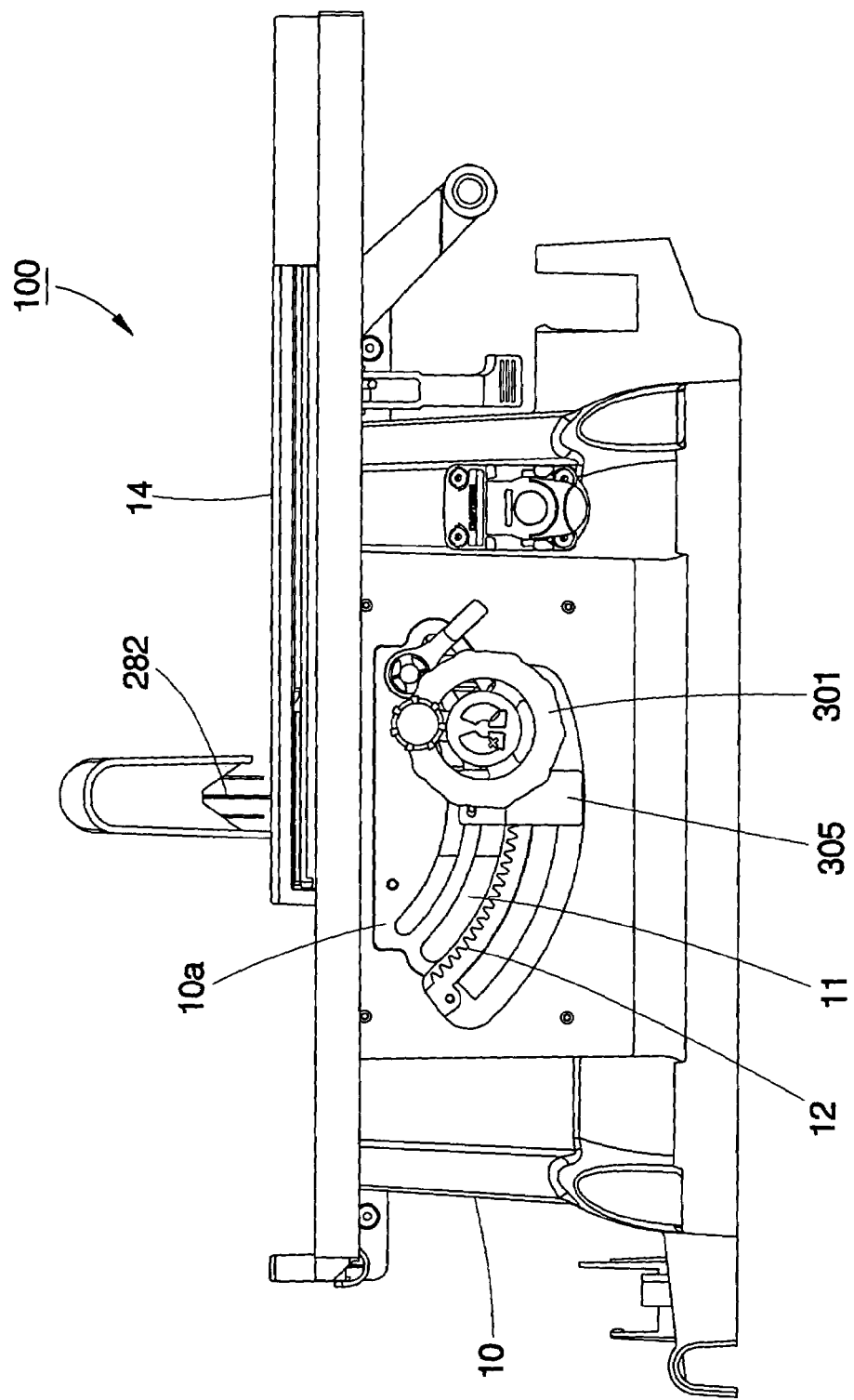
FIG. 7 is a schematic front view of the table saw according to the present invention.

Further, the horizontally extending flat girder base 241 of the suspension girder 24 is close to the bottom side of the table 14 (see FIG. 10). The distance between the horizontally extending flat girder base 241 of the suspension girder 24 and the bottom side of the table 14 is smaller than the diameter (9.5 mm) of the prior art suspension rod 3 shown in FIG. 3. Therefore, when lifting the saw blade 282, a comparatively greater space is available for upward displacement of the motor drive 281. When lifted the saw blade 282 to the upper limit position, the distance S2 between the topmost edge of the saw blade 282 and the top surface of the table 1 is greater than the distance S1 between the topmost edge of the prior art saw blade 2c and the top surface of the prior art table 1, i.e., the saw blade 282 can cut into the workpiece comparatively deeper.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A table saw comprising:
   a machine base having a side panel and an arched slot formed in said side panel;

a table provided at a top side of said machine base, said table having a front side, a rear side, and an opening cut through top and bottom walls thereof;

two supporting devices respectively fixedly fastened to the bottom wall of said table near said front side and said rear side of said table, said supporting devices each having a smoothly arched guide slot;

a suspension girder coupled between said supporting devices, said suspension girder comprising two sliding blocks respectively disposed at two ends thereof and respectively coupled to the smoothly arched guide slots of said supporting devices;

a lifter pivoted to said suspension girder and movable to and fro relative to said suspension girder;

a saw unit fixedly fastened to said lifter, said saw unit comprising a saw blade insertable through the opening of said table; and an adjustment unit having a hand wheel disposed outside the side panel of said machine base, and an adjustment rod inserted through the arched slot of said machine base and coupled between said hand wheel and said lifter for moving said lifter relative to said suspension girder upon rotation of said hand wheel;

wherein said suspension girder comprises a horizontally extending flat girder base, two vertical side plates respectively downwardly extending from two distal ends of said horizontally extending flat girder base for supporting said sliding blocks respectively, and two wings fixedly fastened to said horizontally extending flat girder base, said two wings each having a circular hole; said lifter has at least one through hole; a pin is inserted through the circular holes of said wings and the at least one through hole of said lifter to pivotally secure said lifter to said suspension girder.

2. The table saw as claimed in claim 1, wherein said table has a horizontal axis extending along a top surface thereof, and a vertical axis passing through the opening of said table and intersected with said horizontal axis; said two sliding blocks are movable along a circular track of which the center is the intersected point between said horizontal axis and said vertical axis.

3. The table saw as claimed in claim 1, wherein said supporting devices each are comprised of a locating plate and a guide plate connected to said locating plate, said locating plate having a horizontal wall connected to the bottom wall of said table, and a vertical wall having a smoothly arched slot, said guide plate having said smoothly arched guide slot in communication with the smoothly arched slot of said locating plate.

4. The table saw as claimed in claim 3, wherein the horizontal walls of said locating plates are connected to the bottom wall of said table by screws.

5. The table saw as claimed in claim 1, wherein said lifter comprises a base frame, which supports said saw unit, and two side frames arranged in parallel at two ends of said base frame, the side frames of said lifter each having a through hole and an elongated slot; one vertical side plate of said suspension girder has a locating hole; said adjustment unit further comprises a driven rod coupled to the elongated slot of each of the side frames of said lifter, said driven rod having a transversely extending screw hole; said adjustment rod is inserted through the locating hole of said suspension girder, said adjustment rod having a threaded shaft threaded into the transversely extending screw hole of said driven rod.

* * * * *